US012771165B2

(12) United States Patent
Peng et al.

(10) Patent No.: US 12,771,165 B2
(45) Date of Patent: Oct. 20, 2026

(54) POWER SUPPLY SYSTEM FOR POWER-CONSUMING DEVICE

(71) Applicant: HISENSE (GUANGDONG) AIR CONDITIONING CO., LTD., Guangdong (CN)

(72) Inventors: Qi Peng, Guangdong (CN); Jianneng Zhang, Guangdong (CN)

(73) Assignee: HISENSE (GUANGDONG) AIR CONDITIONING CO., LTD., Guangdong (CN)

( * ) Notice: Subject to any disclaimer, the term of this patent is extended or adjusted under 35 U.S.C. 154(b) by 0 days.

(21) Appl. No.: 19/251,725

(22) Filed: Jun. 26, 2025

(65) Prior Publication Data

US 2025/0373069 A1 Dec. 4, 2025

Related U.S. Application Data

(63) Continuation of application No. PCT/CN2025/095550, filed on May 16, 2025.

(30) Foreign Application Priority Data

May 31, 2024 (CN) ......................... 202410703100.4

(51) Int. Cl.
*H02J 9/06* (2006.01)
*F24F 11/52* (2018.01)
(Continued)

(52) U.S. Cl.
CPC .............. *H02J 9/062* (2013.01); *F24F 11/52* (2018.01); *F24F 11/56* (2018.01); *F24F 11/88* (2018.01); *H02J 2105/42* (2026.01)

(58) Field of Classification Search
CPC .......... H02J 9/06; H02J 9/062; H02J 2105/42; F24F 11/88; F24F 11/56; F24F 11/52
See application file for complete search history.

(56) References Cited

U.S. PATENT DOCUMENTS 10,879,727 B1 12/2020 Cooper
2005/0138437 A1 6/2005 Allen et al.

FOREIGN PATENT DOCUMENTS

CN 104578389 4/2015
CN 115550159 12/2022
(Continued)

OTHER PUBLICATIONS

"International Search Report (Form PCT/ISA/210) of PCT/CN2025/095550," mailed on Aug. 2, 2025, with English translation thereof, pp. 1-6.

(Continued)

*Primary Examiner* — Robert L Deberadinis
(74) *Attorney, Agent, or Firm* — JCIPRNET

(57) ABSTRACT

A power supply system for a power-consuming device, which includes: a switch circuit, first and second processing devices, and a controller. The switch circuit is connected to an external power supply and the power-consuming device. The external power supply includes first and second power supplies. The switch circuit is configured to connect one of the first and second power supplies to the power-consuming device. The first and second processing devices are capable of communicating with each other. The controller is connected to the first and second processing devices and configured to control the first and second processing devices to enter a power type detection mode. In the power type detection mode, the first and second processing devices are respectively connected to the first power supply and the power-consuming device. The second processing device is configured to determine a type of the external power supply according to a communication result.

20 Claims, 5 Drawing Sheets

(51) Int. Cl.

| | |
|---|---|
| ***F24F 11/56*** | (2018.01) |
| ***F24F 11/88*** | (2018.01) |
| *H02J 105/42* | (2026.01) |

(56) References Cited

FOREIGN PATENT DOCUMENTS

| | | | | |
|---|---|---|---|---|
| CN | 115693888 | | 2/2023 | |
| CN | 115962555 | | 4/2023 | |
| CN | 116951698 | | 10/2023 | |
| EP | 3082215 | | 11/2020 | |
| EP | 4325136 | | 2/2024 | |
| GB | 2255208 | | 10/1992 | |
| WO | 116951698 | A * | 1/2025 | ................ H02J 7/34 |

OTHER PUBLICATIONS

"Written Opinion of the International Searching Authority (Form PCT/ISA/237) of PCT/CN2025/095550," mailed on Aug. 2, 2025, with English translation thereof, pp. 1-8.

"Search Report of Europe Counterpart Application", issued on Jun. 2, 2026, p. 1-p. 14.

* cited by examiner

POWER SUPPLY SYSTEM FOR POWER-CONSUMING DEVICE

CROSS-REFERENCE TO RELATED APPLICATIONS

This application is a continuation of the International Application No. PCT/CN2025/095550, filed on May 16, 2025, which claims priority to the Chinese patent application No. 202410703100.4, filed on May 31, 2024. The entire contents each of which is incorporated herein by reference.

FIELD OF TECHNOLOGY

The following relates to the field of power-consuming device technology, and more particularly to a power supply system and a control method for a power-consuming device.

BACKGROUND

Currently, to meet the daily power supply needs of power-consuming devices and avoid power outages, a dual-power supply approach combining strong and weak grids is often adopted. The strong grid typically consists of utility power, while the weak grid is usually formed by backup power supplies such as generators and photovoltaic systems operating as an independent network. When supplying power to power-consuming device, the equipment is typically first connected to the strong power grid. In the event of a power outage or failure in the strong power grid that renders the strong power grid unable to supply power, the power supply will be switched to the weak power grid.

For different types of power supply grids, power-consuming device needs to adjust corresponding control strategies to match the specific type of power supply grid, ensuring stable operation under varying power supply networks, but the above adjustment is usually realized by manual operation of the user. However, when the type of power grid is frequently switched, it is difficult to ensure the timeliness of the user's manual adjustment of the control strategy for the power-consuming device. If the user fails to adjust the control strategy of the power-consuming device in time, it is very likely to cause a situation where the current control strategy does not match the current type of power grid. This may have an impact on the service life of the power-consuming device and even damage the equipment. For instance, when the power supply is switched from the strong power grid to the weak power grid, if the users do not promptly receive the adjusted control strategy, it may result in the malfunction or even damage of the power-consuming device.

SUMMARY

In some embodiments of the present application, a power-consuming device is provided. The power-consuming device includes: a switch circuit, a first processing device, a second processing device and a controller. One end of the switch circuit is connected to an external power supply. The external power supply includes a first power supply and a second power supply. Another end of the switch circuit is connected to the power-consuming device. The switch circuit is configured to connect either the first power supply or the second power supply to the power-consuming device according to a preset rule to supply power to the power-consuming device. The first processing device and the second processing device are capable of communicating with each other. The controller is connected to the first processing device and the second processing device respectively. The controller is configured to control, upon a power-on activation of the power-consuming device, the first processing device and the second processing device to enter a power type detection mode. In the power type detection mode, the first processing device is connected to the first power supply, the second processing device is connected to the power-consuming device, and the first processing device and the second processing device communicate with each other according to a first communication protocol. The second processing device is configured to determine a type of the external power supply currently connected to the power-consuming device according to a communication result between the second processing device and the first processing device. The power-consuming device includes an air conditioner.

In some implementations, the first processing device is configured to periodically send first communication data in the power type detection mode. The first communication data include power information of the first power supply and a network identification code, the network identification code is an identification code of the first processing device, and the power information at least includes a type of power supply. The second processing device is configured to determine the type of the external power supply currently connected to the power-consuming device according to whether the first communication data is received in the power type detection mode.

In some implementations, the second processing device is configured to, when a value of a first timer is greater than a first preset value and the first communication data is not received, determine that the type of the external power supply currently connected to the power-consuming device is the second power supply.

In some implementations, the second processing device is configured to, when a value of a first timer is smaller than or equal to a first preset value and the first communication data is received, compare the first communication data with second communication data stored in advance by the second processing device itself, and determine the type of the external power supply currently connected to the power-consuming device according to a comparison result. The second communication data include a network identification code of a target processing device with which the first processing device is successfully configured in network and power information of a power supply connected to the target processing device.

In some implementations, the second processing device is configured to: determine that the type of the external power supply currently connected to the power-consuming device is the first power supply when the first communication data matches the second communication data; and determine that the type of the external power supply currently connected to the power-consuming device is the second power supply when the first communication data does not match the second communication data.

In some implementations, the second processing device is also configured to set the value of the first timer to zero when the first communication data matches the second communication data.

In some implementations, the controller is further configured to, before controlling the first processing device and the second processing device to enter the power type detection mode, control the first processing device and the second processing device to enter a network configuration mode. In the network configuration mode, the first processing device and the second processing device are both connected to the first power supply and the first processing device and the second processing device communicate for network configuration according to a second communication protocol. The first communication protocol and the second communication protocol are different.

In some implementations, the first processing device is configured to, in the network configuration mode, periodically broadcast third communication data. The third communication data include power information of the first power supply and a network identification code. The network identification code is an identification code of the first processing device. The second processing device is configured to, in the network configuration mode, receive the third communication data, and send a first response message to the first processing device if the network identification code in the third communication data is consistent with a network identification code stored by the second processing device itself, the first response message is used to indicate that the second processing device has been configured in network, and send a second response message to the first processing device if the network identification code in the third communication data is inconsistent with the network identification code stored by the second processing device itself, the second response message is used to indicate that the second processing device has not been configured in network.

In some implementations, the first power supply is a mains power supply, the second power supply is a backup power supply. The first processing device is also configured to, if the second response message is received, send fourth communication data to the second processing device, the fourth communication data include one or more of the following: the network identification code, an intra-network encoding of the second processing device, a maximum allowed total current, a reference temperature difference, and a reference rated current. The second processing device is also configured to receive and store the fourth communication data. The maximum allowed total current is a maximum current that the backup power supply can support, and at least one of the reference temperature difference and the reference rated current is used by the second processing device to determine power demand information of the power-consuming device.

In some implementations, the second processing device includes a plurality of processing devices, and the power-consuming device includes a plurality of power-consuming devices. The plurality of processing devices are respectively connected to the plurality of power-consuming devices. In a case where the external power supply currently connected to the power-consuming device is the backup power supply, one of the plurality of processing devices is configured as a temporary master device while remaining processing devices are configured as slave devices. The temporary master device is configured to allocate currents to the plurality of power-consuming devices according to the power demand information of the plurality of power-consuming devices.

In some implementations, the temporary master device is configured to send a broadcast message and a designated message to the slave devices. The broadcast message includes the network identification code, a first communication mode code, a reference limit current, and an intra-network encoding of the temporary master device. The designated message includes the network identification code, a second communication mode code, an intra-network encoding of a designated slave device, and request information. The first communication code is used to indicate that a type of a current message is the broadcast message, the second communication code is used to indicate that the type of the current message is he designated message, the request information is used to request the power demand information, and the reference limit current is used by the slave device to determine a currently-allowed operating current. The slave device is configured to set the value of the first timer to zero if the broadcast message is received, and send the power demand information to the temporary master device if the designated message is received and the intra-network encoding of the designated slave device in the designated message is the intra-network encoding of the slave device itself.

In some implementations, the power demand information is a power consumption coefficient, and the slave device is configured to determine the power consumption coefficient based on a difference between a set temperature of a current operating mode and an ambient temperature, the reference temperature difference, a rated current of the current operating mode, and the reference rated current, and send the power consumption coefficient to the temporary master device.

In some implementations, the temporary master device is configured to determine the reference limit current according to a total power consumption coefficient of the plurality of power-consuming devices and the maximum allowed total current.

In some implementations, the slave device is configured to determine a currently-allowed operating current based on a product of the reference limit current and the power consumption coefficient of the slave device itself, and send the currently-allowed operating current to the power-consuming device connected to the slave device to adjust a operating mode of the power-consuming device.

In some implementations, the broadcast message and the designated message are transmitted in an alternating manner. In some implementations, the temporary master device is a processing device having a smallest intra-network encoding among the plurality of processing devices. In some implementations, the temporary master device before obtaining the power demand information of the plurality of power-consuming devices, is also configured to set the reference limit current to zero.

In some implementations, the first power supply is a mains power supply, the second power supply is a backup power supply provided by a power generation device, and the switch circuit is configured to connect the first power supply to the power-consuming device when the first power supply is not faulty, and connect the second power supply to the power-consuming device when the first power supply is faulty.

In some implementations, the switch circuit includes a first switch and a second switch. The first power supply is connected to the power-consuming device via the first switch, and the second power supply is connected to the power-consuming device via the second switch. The first power supply is connected to the power-consuming device when the first switch is switched on and the second switch is switched off. The second power supply is connected to the power-consuming device when the first switch is switched off and the second switch is switched on.

In some embodiments of the present application, a method for controlling a power-consuming device is provided, the control method is applied to a second processing device in a power supply system for the power-consuming device. The power supply system also includes a first processing device and a switch circuit, one end of the switch circuit is connected to an external power supply, the external power supply includes a first power supply and a second power supply, the first power supply and the second power supply is of different types, another end of the switch circuit is connected to the power-consuming device. The switch circuit is configured to connect one of the first power supply and the second power supply to the power-consuming device according to a preset rule to supply power to the power-consuming device. In a power type detection mode, the first processing device is connected to the first power supply, the second processing device is connected to the power-consuming device. The first processing device and the second processing device communicating with each other according to a first communication protocol. The method includes a step of determining a type of the external power supply currently connected to the power-consuming device according to a communication result between the second processing device and the first processing device.

In some implementations, the step of determining the type of the external power supply currently connected to the power-consuming device according to the communication result between the second processing device and the first processing device includes a step of determining the type of the external power supply currently connected to the power-consuming device according to whether the first communication data is received.

In some implementations, the step of determining the type of the external power supply currently connected to the power-consuming device according to whether the first communication data is received includes steps of: determining that the type of the external power supply currently connected to the power-consuming device is the second power supply when a value of a first timer is greater than a first preset value and the first communication data is not received; comparing the first communication data with second communication data stored in advance by the second processing device itself when the value of the first timer is smaller than or equal to the first preset value and the first communication data is received, and determining the type of the external power supply currently connected to the power-consuming device according to a comparison result. The second communication data include a network identification code of a target processing device with which the first processing device is successfully configured in network and power information of a power supply connected to the target processing device.

In some implementations, the step of determining the type of the external power supply currently connected to the power-consuming device according to the comparison result includes steps of: determining that the type of the external power supply currently connected to the power-consuming device is the first power supply when the first communication data matches the second communication data; and determining that the type of the external power supply currently connected to the power-consuming device is the second power supply when the first communication data does not match the second communication data. In some implementations, the method also includes a step of setting the value of the first timer to zero when the first communication data matches the second communication data.

In some implementations, the method also includes a step of: receiving third communication data periodically broadcast by the first processing device in a network configuration mode, where the third communication data include power information of the first power supply and a network identification code, the network identification code is an identification code of the first processing device; sending a first response message to the first processing device if the network identification code in the third communication data is consistent with a network identification code stored by the second processing device, where the first response message is used to indicate that the second processing device has been configured in network; and sending a second response message to the first processing device if the network identification code in the third communication data is inconsistent with the network identification code stored by the second processing device, where the second response message is used to indicate that the second processing device has not been configured in network.

In some implementations, the method also includes steps of receiving and storing fourth communication data. The fourth communication data is sent by the first processing device in response to the second response message. The fourth communication data include one or more of the following: the network identification code, an intra-network encoding of the second processing device, a maximum allowed total current, a reference temperature difference, and a reference rated current. The maximum allowed total current is a maximum current that can be supported by the backup power supply, and at least one of the reference temperature difference and the reference rated current is used by the second processing device to determine the power demand information of the power-consuming device.

In some implementations, the second processing device includes a plurality of processing devices, and the power-consuming device includes a plurality of power-consuming devices. The plurality of processing devices is respectively connected to the plurality of power-consuming devices. In a case where the external power supply currently connected to the power-consuming device is the backup power supply, one of the plurality of processing devices is configured as a temporary master device while remaining processing devices are configured as slave devices. The method also includes allocating, by the temporary master device, currents to the plurality of power-consuming devices according to the power demand information of the plurality of power-consuming devices.

In some implementations, the method also includes a step of sending, by the temporary master device, a broadcast message and a designated message to the slave devices. The broadcast message includes the network identification code, a first communication mode code, a reference limit current, and an intra-network encoding of the temporary master device. The designated message includes the network identification code, a second communication mode code, an intra-network encoding of a designated slave device, and request information. The first communication code is used to indicate that a type of a current message is the broadcast message. The second communication code is used to indicate that the type of the current message is the designated message. The request information is used to request power demand information. The reference limit current is used by the slave device to determine a currently-allowed operating current. The method also includes steps of: setting the value of the first timer to zero if the broadcast message is received by the slave device; and sending the power demand information to the temporary master device if the designated message is received by the slave device and the intra-network encoding of the designated slave device in the designated message is an intra-network encoding of the slave device itself.

In some implementations, the power demand information is a power consumption coefficient, and the method also includes steps of determining, by the slave device, the power consumption coefficient based on a difference between a set temperature of a current operating mode and an ambient temperature, the reference temperature difference, a rated current of the current operating mode, and the reference rated current, and sending the power consumption coefficient to the temporary master device.

In some implementations, the method also includes a step of determining, by the temporary master device, the reference limit current according to a total power consumption coefficient of the plurality of power-consuming devices and the maximum allowed total current. In some implementations, the method also includes steps of: determining, by the slave device, a currently-allowed operating current based on a product of the reference limit current and the power consumption coefficient of the slave device, and sending, by the slave device, the currently-allowed operating current to power-consuming device connected to the slave device to adjust an operating mode of the power-consuming device.

In some implementations, the broadcast message and the designated message are transmitted in an alternating manner. In some implementations, the temporary master device is a processing device having a smallest intra-network encoding among the plurality of processing devices. In some implementations, the method also includes a step of setting the reference limit current to zero by the temporary master device before obtaining the power demand information of the plurality of power-consuming devices.

DETAILED DESCRIPTION OF THE EMBODIMENTS

Technical schemes in some embodiments of the present application will be clearly and completely described below in combination with the drawings in some embodiments of the present application. Obviously, the described embodiments are only part but not all of the embodiments of the present application. Based on the embodiments in the present application, all other embodiments obtained by a person of ordinary skill in the art without exerting creative efforts shall fall within the protection scope of the present application.

A power supply system 10 and a control method for a power-consuming device according to some embodiments of the present application will be described below in combination with FIGS. 1-11.

Figure 1:
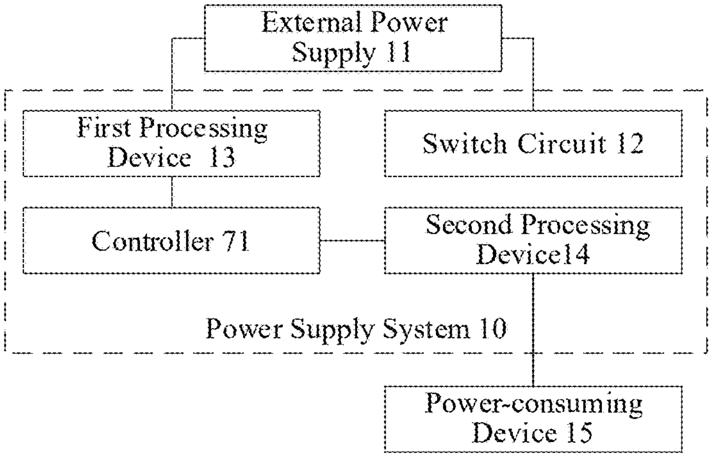
FIG. 1 is a schematic diagram of a power supply system for a power-consuming device according to an embodiment of the present application.

FIG. 1 is a schematic diagram of a power supply system for a power-consuming device according to an embodiment of the present application. As shown in FIG. 1, the power supply system 10 includes a switch circuit 12, one end of the switch circuit 12 is connected to an external power supply 11, the external power supply 11 includes a first power supply 111 and a second power supply 112, another end of the switch circuit 12 is connected to the power-consuming device 15, and the switch circuit 12 is configured to connect one of the first power supply 111 and the second power supply 112 to the power-consuming device 15 according to a preset rule to supply power to the power-consuming device 15.

In some implementations, the switch circuit 12 may be an alternating current (AC) contactor, and the power-consuming device 15 may include an air conditioner.

The first power supply and the second power supply are of different types. In some implementations, the first power supply and the second power supply are of different stabilities. One of the first power supply and the second power supply is relatively stable and is not easily affected by a power load, and the other one is unstable and is easily affected by the power load. In some implementations, one of the first power supply and the second power supply is a strong grid power supply, and the other one is a weak grid power supply. For example, one of the first power supply and the second power supply is a mains power supply, and the other is a backup power supply.

The power supply system 10 also includes a first processing device 13 and a second processing device 14, which are capable of communicating with each other. The first processing device 13 may also be referred to as a detection device, and the second processing device 14 may also be referred to as a receiving device. The first processing device 13 may be located before the switch circuit 12, and the second processing device 14 may be located after the switch circuit 12. In other words, the first processing device 13 is fixedly connected to the first power supply, and the second processing device 14 is of the same type as the external power supply to which the power-consuming device 15 is connected.

The power supply system 10 also includes a controller 71. the controller 71 is connected to the first processing device 13 and the second processing device 14, respectively. The controller 71 is configured to control, upon a power-on activation of the power-consuming device 15, both the first processing device 13 and the second processing device 14 to enter a power type detection mode. In the power type detection mode, the first processing device 13 is connected to the first power supply, the second processing device 14 is connected to the power-consuming device 15, and the first processing device 13 and the second processing device 14 communicate with each other according to a first communication protocol.

The second processing device 14 is configured to determine a type of the external power supply 11 currently connected to the power-consuming device 15 according to a communication result between the second processing device and the first processing device.

Here, the first power supply may be a default power supply. In some implementations, the first power supply is a mains power supply, and the second power supply is a backup power supply.

The power-consuming device 15 provided in some embodiments of the present application is connected to one of the first power supply 111 and the second power supply 112 through the switch circuit 12, to supply power to the power-consuming device. When the power-consuming device 15 is powered on and enters the power type detection mode, the first processing device 13 is connected to the first power supply, the second processing device 14 is connected to the power-consuming device 15, and the first processing device 13 and the second processing device 14 communicate with each other according to the first communication protocol. The second processing device 14 may determine the type of the external power supply 11 currently connected to the power-consuming device 15 according to the communication result. Based on this, the present application can automatically identify the type of the external power supply 11 connected to the power-consuming device 15. Thus, when the external power supply 11 changes, the power-consuming device 15 can identify change information of the type of the external power supply 11 in time, which thus facilitates the power-consuming device 15 to promptly adjust the control strategy to adapt to different types of external power supplies 11, avoiding damage to the power-consuming device 15, and helping to improve the operational safety and service life of the power-consuming device 15.

In some embodiments, the controller 71 refers to a device that can generate operation control signals according to instruction operation codes and timing signals to instruct the power-consuming device 15 to execute control instructions. For example, in response to receiving a power-on or power-off instruction issued by a user, the controller 71 may perform operations related to an object selected by the power-on or power-off instruction.

Figure 2:
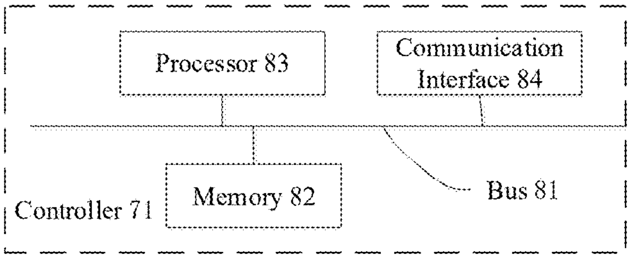
FIG. 2 is a structural schematic diagram of a controller according to an embodiment of the present application.

FIG. 2 is a schematic diagram of a structure of a controller according to an embodiment of the present application. As shown in FIG. 2, in this embodiment, the controller 71 includes a processor 83, and optionally, a memory 82 and a communication interface 84 connected to the processor 83. The processor 83, the memory 82 and the communication interface 84 are connected through a bus 81.

The processor 83 may be a central processing unit (CPU), a general-purpose processor, a network processor (NP), a digital signal processor (DSP), a microprocessor, a microcontroller, a programmable logic device (PLD), or any combination thereof. The processor 83 may also be any device or apparatus with processing functionality, such as a circuit, a device, or a software module. The processor 83 may also include multiple CPUs, and the processor 83 may be a single-CPU processor 83 or a multi-CPU processor 83. The processor 83 here may refer to one or more devices, circuits, or processing cores for processing data, such as computer program instructions.

The memory 82 may be a read-only memory (ROM) or other type of static storage device that may store static information and instructions, a random access memory (RAM), or other type of dynamic storage device that can store information and instructions, and may be an electrically erasable programmable read-only memory (EEPROM), a compact disc read-only memory (CD-ROM) or other optical disc storage, a disc storage (including compact discs, laser discs, digital versatile discs, Blu-ray discs, etc.), magnetic disk storage media or other magnetic storage devices, or any other medium that can be used to carry or store desired program code in the form of instructions or data structures and can be accessed by a computer. Some embodiments of the present application impose no limitations in this regard. The memory 82 may exist independently or be integrated with the processor 83. The memory 82 may include computer program code therein. The processor 83 is configured to execute the computer program code stored in the memory 82, to implement the control method for the power-consuming device 15 provided by some embodiments of the present application.

The communication interface 84 may be used for communication with other devices or communication networks, such as Ethernet, a radio access network (RAN), a wireless local area network (WLAN), etc. The communication interface 84 may be a module, a circuit, a transceiver, or any device capable of enabling communication.

The bus 81 may be a peripheral component interconnect (PCI) bus 81, an extended industry standard architecture (EISA) bus 81, or the like. The bus 81 may be divided into an address bus 81, a data bus 81, a control bus 81, etc.

Figure 3:
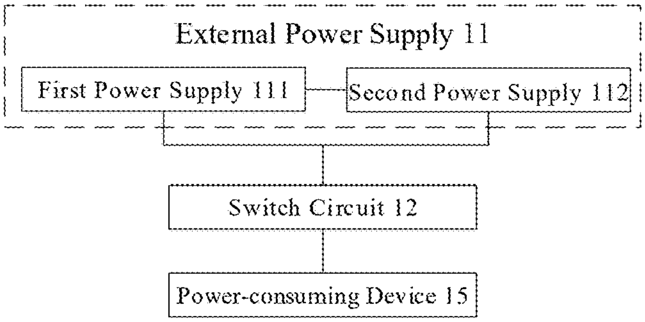
FIG. 3 is a structural schematic diagram of an external power supply according to an embodiment of the present application.

FIG. 3 is a schematic diagram of a structure of an external power supply according to an embodiment of the present application. As shown in FIG. 3, in this embodiment, the external power supply 11 includes a first power supply 111 and a second power supply 112. The external power supply 11 is connected to the power-consuming device 15 through a switch circuit 12. The switch circuit 12 is used for connecting one of the first power supply 111 and the second power supply 112 to the power-consuming device 15 according to a preset rule, to supply power to the power-consuming device 15.

In an embodiment of the present application, the first processing device 13 is configured to periodically send first communication data in the power type detection mode. The first communication data include power information of the first power supply and a network identification code. The network identification code may be an identification code of the first processing device 13, where the identification code is used for uniquely identifying the first processing device 13. The power information at least includes a type of power supply. The second processing device 14 is configured to determine, according to whether the first communication data is received by the second processing device itself, a type of the external power supply 11 currently connected to the power-consuming device 15.

In some implementations, the first processing device 13 and the second processing device 14 communicate with each other according to a first communication protocol. The first communication data is sent by the first processing device 13 according to a preset frequency, that is, the first communication data is periodically sent. The type of the external power supply 11 currently connected to the power-consuming device 15 is determined by the second processing device 14 based on whether the first communication data sent by the first processing device 13 is received by the second processing device itself. This judgment method is not only simple and straightforward but also does not rely on hardware, resulting in lower costs. In addition, the first communication data not only contains information on type of power supply of the required default power supply, but also contains the identification code used for identifying the unique identity of the first processing device 13, so that the uniqueness of the first communication data can be ensured, and the safety and accuracy of communication transmission can be effectively increased.

In some implementations, the power information at least includes the type of power supply, and it should be noted that the power information may also include, but is not limited to, voltage, current and other information of the power supply.

In an embodiment of the present application, the second processing device 14 is configured to determine that the type of the external power supply 11 currently connected to the power-consuming device 15 is the second power supply 112 when the first communication data is not received.

For example, when the second processing device 14 does not receive the first communication data, it may be determined that the type of the power supply currently connected to the power-consuming device 15 is different from the type of the power supply connected to the first processing device 13, and since the first power supply is the default power supply, it can be determined that the external power supply 11 currently connected to the power-consuming device 15 is the second power supply 112.

In an embodiment of the present application, the second processing device 14 is configured to compare, when the first communication data is received, the first communication data with second communication data stored in advance by the second processing device, and determine the type of the external power supply 11 currently connected to the power-consuming device 15 according to a comparison result. The second communication data include an identification code of a target processing device with which the first processing device 13 is successfully configured in a network and power information of a power connected to the target processing device.

Particularly, when the second processing device 14 receives the first communication data, it is also required to compare and determine whether the first communication data is consistent with the second communication data stored in advance by the second processing device 14. the judgment on whether the type of the external power supply 11 currently connected to the power-consuming device 15 is consistent with the default power supply connected to the first processing device 13 can only be made based on the comparison result, so that misjudgment caused by interference from other signals can be avoided, and the safety and accuracy of communication transmission can be effectively increased.

In some implementations, the second processing device 14 may maintain a first timer. If the second processing device 14 has not received the first communication data when a value of the first timer is greater than a first preset value, then the second processing device 14 may determine that the type of the external power supply currently connected to the power-consuming device is the second power supply. If the second processing device 14 receives the first communication data when the value of the first timer is smaller than or equal to the first preset value, the second processing device 14 may determine the type of the external power supply currently connected to the power-consuming device according to a comparison result of the first communication data and the second communication data stored in the second processing device 14. The first preset value may be denoted as Tmax hereinafter.

In an embodiment of the present application, the second processing device 14 is configured to determine that the type of the external power supply 11 currently connected to the power-consuming device 15 is the first power supply when the first communication data matches the second communication data; and determine that the external power supply 11 currently connected to the power-consuming device 15 is the second power supply 112 when the first communication data does not match the second communication data.

If the first communication data is received by the second processing device 14 and the first communication data matches the second communication data stored in the second processing device 14, then it is determined that the type of the external power supply 11 currently connected to the power-consuming device 15 is consistent with the type of the power supply connected to the first processing device 13, that is, the external power supply 11 currently connected to the power-consuming device 15 is the first power supply. If the first communication data is received by the second processing device 14 and the first communication data does not match the second communication data stored in the second processing device 14, it is determined that the type of the external power supply 11 currently connected to the power-consuming device 15 is inconsistent with the type of the power supply connected to the first processing device 13, that is, the external power supply 11 currently connected to the power-consuming device 15 is not the first power supply but the second power supply 112.

The first communication data matching the second communication data may include one or more of the following: the network identification code in the first communication data is consistent with the network identification code in the second communication data, or the power information in the first communication data is consistent with the power information in the second communication data.

Thus, by comparing the first communication data with the second communication data stored in advance by the second processing device 14 to determine whether they are consistent, and determining whether the type of the external power supply 11 currently connected to the power-consuming device 15 is consistent with the type of the power supply connected to the first processing device 13 according to the comparison result, misjudgment caused by interference from other signals can be avoided. For example, under the same power supply network, the second processing device 14 may also receive information sent by other devices. If judgment is made solely based on whether information is received without conducting a comparison, it will lead to misjudgment. Since the other devices have no corresponding power information and their identification codes are not matched, the second processing device 14 can filter out these unmatched devices by comparison, thereby the security and accuracy of communication transmission are effectively enhanced.

Based on the above, in some embodiments of the present application, the second processing device 14 determines the type of the external power supply 11 currently connected to the power-consuming device 15 according to whether the first communication data sent by the first processing device 13 is received, following the principles below: determining that the type of the power supply connected to the power-consuming device 15 is different from that of the power supply connected to the first processing device 13, that is, the type of the external power supply 11 currently connected to the power-consuming device 15 is the second power supply 112, when the first communication data is not received by the second processing device 14; determining that the type of the external power supply 11 currently connected to the power-consuming device 15 is consistent with the type of the external power supply 11 connected to the first processing device 13, that is, the external power supply 11 currently connected to the power-consuming device 15 is the first power supply, when the first communication data is received by the second processing device 14 and the first communication data matches the second communication data stored in advance by the second processing device 14; and determining that the type of the external power supply 11 currently connected to the power-consuming device 15 is inconsistent with the type of the external power supply 11 connected to the first processing device 13, that is, the external power supply 11 currently connected to the power-consuming device 15 is the second power supply 112 when the first communication data is received by the second processing device 14 and the first communication data does not match the second communication data stored in advance by the second processing device 14.

Thus, in some embodiments of the present application, by determining through the second processing device 14 whether the type of the external power supply 11 currently connected to the power-consuming device 15 is consistent with the type of the external power supply 11 connected to the first processing device 13 according to whether the first communication data sent by the first processing device 13 is received by the second processing device 14 and whether the first communication data is consistent with the second communication data stored in advance by the second processing device 14, the type of the external power supply 11 currently connected to the power-consuming device 15 can be accurately identified, misjudgment caused by interference from other signals in the communication process can be avoided, and the security and accuracy of the communication transmission are effectively enhanced.

In some implementations, the second processing device 14 is also configured to, when the first communication data matches the second communication data, set the value of the first timer to 0, causing the first timer to restart timing.

In an embodiment of the present application, the controller 71 is also configured to control the first processing device 13 and the second processing device 14 to enter a network configuration mode before controlling the first processing device 13 and the second processing device 14 to enter the power type detection mode. In the network configuration mode, the first processing device 13 and the second processing device 14 are simultaneously connected to the first power supply. The first processing device 13 and the second processing device 14 communicate for network configuration according to a second communication protocol. The second communication protocol is different from the first communication protocol. Through different communication protocols, the second processing device 14 can identify the current processing mode type to perform a corresponding operation process.

Figure 4:
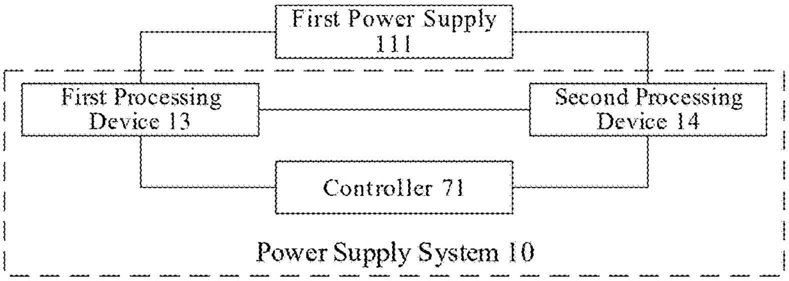
FIG. 4 is a structural schematic diagram of a power supply system for a power-consuming device according to another embodiment of the present application.

FIG. 4 is a schematic diagram of a structure of the power-consuming device according to another embodiment of the present application. As shown in FIG. 4, in this embodiment, before entering the power type detection mode, it is also necessary to first enter a network configuration mode. In the network configuration mode, the first processing device 13 and the second processing device 14 are simultaneously connected to the first power supply, and the first processing device 13 and the second processing device 14 communicate for network configuration according to a second communication protocol that is different from the first communication protocol. Based on this, some embodiments of the present application can perform communication for network configuration on the first processing device 13 and the second processing device 14 before entering the power type detection mode, providing a basis for the power type detection mode. After the network configuration is successfully completed, the power information sent by the first processing device 13 is stored in the second processing device 14, realizing pairing. Thus, in the power type detection mode, the second processing device 14 can determine the type of the external power supply 11 connected to the power-consuming device 15 according to the communication result.

In some embodiments of the present application, the second communication protocol used in the network configuration mode is different from the first communication protocol used in the power type detection mode. For example, the communication rates of the second communication protocol and the first communication protocol are different, such as the number of data frames transmitted each time is different. For another example, the syntax of the second communication protocol differs from that of the first communication protocol, that is, how communication is conducted, including data format, encoding, and communication signal levels, among which the communication signal levels may be characterized by voltage levels. For another example, the semantics of the second communication protocol and the first communication protocol are different, that is, the communication content, including the data content, meaning, and control information, etc. For another example, the timing rules (timing sequences) of the second communication protocol and the first communication protocol are different, that is, when to communicate, the timing rules may be used to determine the order, rate matching, and sorting of communication.

Thus, in some embodiments of the present application, different communication protocols are used for the network configuration mode and the power type detection mode, so that the network configuration and the detection of the type of power supply can be performed independently. In addition, the second processing device 14 can receive the specific information sent by the first processing device 13 in a particular mode only when the second processing device 14 adopts the same communication protocol as the first processing device 13, which thus can ensure the exclusivity and security of the transmitted information.

In an embodiment of the present application, the first processing device 13 is configured to periodically broadcast third communication data in the network configuration mode. The third communication data include the power information of the first power supply and a network identification code, and the network identification code is the identification code of the first processing device.

In some implementations, the second processing device 14 is configured as follows: When, within a preset time period, the number of consecutive receptions of the power information of the first power supply and the network identification code of the first processing device 13 reaches the preset number of times, it is determined that the second processing device 14 and the first processing device 13 are successfully configured for network, and the power information of the first power supply and the network identification code of the first processing device 13 are stored; otherwise, it is determined that the network configuration fails, and the process of communication for network configuration is terminated.

In this embodiment, the first processing device 13 and the second processing device 14 communicate for network configuration according to the second communication protocol. The first processing device 13 periodically broadcasts the power information of the first power supply and the network identification code of the first processing device 13, and if the number of consecutive receptions of the power information of the first power supply and the network identification code of the first processing device 13 reaches the preset number of times, for example, but not limited to, three times within the preset time period, it is determined that the second processing device 14 and the first processing device 13 are successfully configured in network, and the power information of the first power supply and the network identification code of the first processing device 13 are stored by the second processing device 14. Otherwise, if the second processing device 14 does not receive the power information of the first power supply and the network identification code of the first processing device 13, or the number of times that the second processing device 14 continuously receives the power information of the first power supply and the network identification code of the first processing device 13 within the preset time period is smaller than the preset number of times, it is determined that the network configuration between the second processing device 14 and the first processing device 13 has failed, and the process of communication for network configuration is terminated.

As can be seen from the above, in this embodiment, the method of communication for network configuration between the first processing device 13 and the second processing device 14 according to the second communication protocol is not only simple and straightforward in judgment but also does not rely on hardware, resulting in lower costs. Meanwhile, it can be determined that the second processing device 14 and the first processing device 13 are successfully configured in network only when the number of times that the second processing device 14 continuously receives the power information of the first power supply and the network identification code of the first processing device 13 reaches the preset number of times. The criteria for determining successful network configuration is enhanced, the reliability of the network configuration process is improved, thus, the second processing device 14 can avoid mistakenly receiving and storing other information, thereby the security and accuracy of the communication for network configuration are effectively enhanced.

In an embodiment of the present application, the second processing device 14 is also configured to display prompt information of successful network configuration or prompt information of failed network configuration, and correspondingly send feedback information of successful network configuration or feedback information of failed network configuration to the first processing device 13. The first processing device 13 is also configured, when receiving the feedback information of successful network configuration or the feedback information of failed network configuration, to correspondingly display the prompt information of successful network configuration or the prompt information of failed network configuration.

In case of the second processing device 14 determining that the network configuration between the second processing device 14 and the first processing device 13 is successful when the number of consecutive receptions of the power information of the first power supply and the network identification code of the first processing device 13 reaches the preset number of times, the second processing device 14 is configured to display the prompt information indicating that the network configuration is successful or the prompt information indicating that the network configuration fails, and send the same to the first processing device 13. The first processing device 13 is configured, when receiving the feedback information indicating that the network configuration is successful or the feedback information indicating that the network configuration fails, to correspondingly display the prompt information indicating that the network configuration is successful or the prompt information indicating that the network configuration fails on a display of the first processing device 13. As can be seen in this embodiment that both the first processing device 13 and the second processing device 14 can display the prompt information of successful network configuration or the prompt information of failed network configuration, thus prompts can be provided to users. This enables the users to promptly and clearly understand the network configuration results, facilitating timely handling when the network configuration is unsuccessful.

In some implementations, the second processing device 14 is configured to, in the network configuration mode, receive the third communication data, and send a first response message to the first processing device 13 if a network identification code in the third communication data is consistent with the network identification code stored in the second processing device 14. The first response message is used to indicate that the second processing device 14 has been configured in network. The second processing device 14 is configured to send a second response message to the first processing device 13 if the network identification code in the third communication data is inconsistent with the network identification code stored in the second processing device 14. The second response message is used to indicate that the second processing device 14 has not been configured in network.

If the network identification code in the third communication data is consistent with the network identification code stored in the second processing device 14, then it is indicated that the second processing device 14 has completed the network configuration with the first processing device 13 before, and thus the process of network configuration can be skipped. If the network identification code in the third communication data is inconsistent with the network identification code stored in the second processing device 14, such as when the second processing device 14 has not stored the network identification code of the first processing device 13, or when the second processing device 14 has stored the network identification code of another processing device, then it is indicates that the second processing device 14 has not undergone network pairing with the first processing device 13. The first processing device 13 and the second processing device 14 need to continue to perform the process of network configuration.

In some implementations, to perform more accurate identification, the second processing device 14 may compare the network identification code and the power information in the third communication data with the network identification code and the power information that are stored in the second processing device 14, respectively, to determine whether the network configuration with the first processing device 13 has been completed. Only when the network identification code in the third communication data is consistent with the network identification code stored in the second processing device 14, and the power information in the third communication data is consistent with the power information stored in the second processing device 14, the second processing device 14 considers that the network configuration with the first processing device 13 has been completed, otherwise, the second processing device 14 considers that the network configuration with the first processing device 13 has not been performed.

In some implementations, the second processing device 14 may be connected to a second display, and the second processing device 14 is configured to display the network configuration information through the second display after successfully configuring the network with the first processing device 13 or after determining that the network configuration with the first processing device 13 has been completed. In some implementations, the first processing device 13 is configured to terminate the network configuration mode if the first response message sent by the second processing device 14 is received.

In some implementations, the first power supply is a mains power supply, and the second power supply is a backup power supply. The first processing device 13 is configured to, upon receiving the second response message sent by the second processing device 14, send fourth communication data to the second processing device 14. The fourth communication data include one or more of the following: a network identification code, an intra-network encoding of the second processing device, a maximum allowed total current, a reference temperature difference, and a reference rated current. The second processing device 14 is configured to receive and store the fourth communication data. The network configuration is completed after the fourth communication data is received and stored by the second processing device 14, and the information of successful network configuration can be displayed by the second processing device 14 on the display. The network identification code is the network identification code of the first processing device 13.

The intra-network encoding of the second processing device 14 is an encoding assigned to the second processing device 14 by the first processing device 13, and the first processing device 13 can allocate an encoding to each processing device that performs network configuration with the first processing device 13. For example, if there are three second processing devices (e.g., a processing device 1, a processing device 2, and a processing device 3) that perform network configuration with the first processing device, the first processing device 13 may allocate an encoding 1 to the processing device 1, an encoding 2 to the processing device 2, and an encoding 3 to the processing device 3. The encoding size allocated by the first processing device 13 to the processing devices is related to the sequence in which the processing devices and the first processing device 13 perform network configuration. The intra-network encoding is also denoted as Ni hereinafter.

The maximum allowed total current is the highest current that can be supported by the backup power supply. If the sum of operating currents of all the power-consuming devices exceeds the maximum allowed total current, a circuit fault will occur, and the power-consuming devices cannot operate normally, and may even be damaged.

One or both of the reference temperature difference and the reference rated current may be used by the second processing device 14 to determine the power demand information of the power-consuming device. In some implementations, the reference temperature difference may be included in the fourth communication data if the operating mode of the power-consuming device is related to temperature, and the reference temperature difference may not be included in the fourth communication data if the operating mode of the power-consuming device is not related to temperature. For example, the reference temperature difference may be included in the fourth communication data if the power-consuming device is an air conditioner or a water heater, and the reference temperature difference may not be included in the fourth communication data if the power-consuming device is a television.

The reference rated current may be determined based on the rated current of the power-consuming device. The power-consuming device connected to the external power supply may be a plurality of power-consuming devices, and the reference rated current may be determined based on the rated currents of the plurality of power-consuming devices, for example, the reference rated current may be an average of the rated currents of the plurality of power-consuming devices.

In some implementations, the fourth communication data may also be included in the first communication data, that is, the first processing device 13 may send the fourth communication data to the second processing device 14 in the power type detection mode. After the network configuration is completed, if the first processing device 13 needs to update one or more of the following parameters: the maximum allowed total current, the reference temperature difference, and the reference rated current, then the fourth communication data may be sent to the second processing device 14 in the power type detection mode for updating, so as to improve the flexibility of transmission of the fourth communication data.

The network configuration mode and the power type detection mode are described in detail below.

In the network configuration mode, the first processing device 13 and the second processing device 14 communicate with each other in the network configuration protocol. The network configuration is automatically activated when the second processing device 14 is connected to the first processing device 13. At this time, the first processing device 13 sends its own unique network identification code and the power information of the first power supply to the second processing device 14. The second processing device 14 may compare the received network identification code with the network identification code stored in the second processing device. If the network identification codes are consistent, then the second processing device replies to the first processing device 13 that the network has been configured and displays the configured network information. If the network identification codes are inconsistent, then the second processing device replies to the first processing device 13 that the network has not been configured, and the first processing device 13 may allocate an intra-network encoding Ni to the second processing device 14, where i is a positive integer. In addition, the network identification code, the intra-network encoding (Ni), the maximum allowed total current Imax (Imax is used when the power grid is weak), the reference temperature difference (ΔTmax), the reference rated current (RCmax), and other information may be sent by the first processing device 13 to the second processing device 14. The second processing device 14 may receive and store the above information and display the information of successful network configuration.

In the power type detection mode, the first processing device 13 and the second processing device 14 communicate with each other in a standard protocol. The first processing device 13 is fixedly connected to the first power supply. The first processing device 13, when starts operating, defaults to a master device (i.e., actively sending data) and broadcasts the network identification code, the communication mode code, the intra-network encoding of the first processing device, the maximum allowed total current Imax, the reference temperature difference (ΔTmax), and the reference rated current (RCmax) to an entire network at a fixed frequency.

The second processing device 14, when starts operating, defaults to a slave device (i.e., it does not actively send data, but only determines whether to reply with data based on instructions after receiving data), and the first timer Ti (i=1–n) starts to count. If the network identification code in the data correctly received by the second processing device 14 is consistent with the previously stored network identification code, then it is determined that the power is supply by the first power supply, and the count of the first timer Ti is set to 0. If the value of the first timer Ti is greater than a preset value (Tmax), then it is determined that the power supply at this time is the second power supply, so that the detection function on power grid information is realized.

In some implementations, when the external power supply currently connected to the power-consuming device is a backup power supply, this application may form a local area network by grouping multiple networked power-consuming devices, with one device serving as a temporary master device for dynamic energy consumption management and control.

For example, the second processing device 14 may include a plurality of processing devices, and the power-consuming device may include a plurality of power-consuming devices. The plurality of processing devices are respectively connected to the plurality of power-consuming devices. One of the plurality of processing devices is configured as a temporary master device, and the remaining processing devices are configured as slave devices. To avoid damage to the power-consuming devices, the temporary master device may be configured to allocate current to the power-consuming device according to the power demand information of the power-consuming devices. The temporary master device may be any one of the plurality of processing devices. In some implementations, the temporary master device may be the processing device having the smallest intra-network encoding in the plurality of processing devices.

For example, for a family, a plurality of power-consuming devices may be installed. Each power-consuming device may be connected to one second processing device. When the external power supply is a backup power supply, the voltage of the backup power supply fluctuates greatly, and the power supply is unstable. If the operating current of the power-consuming device is not controlled, circuit malfunctions or damage to the power-consuming device will be caused. Based on this, the present application proposes that the temporary master device allocates current to the power-consuming device according to the power demand information of the power-consuming devices, so that the power-consuming device can be prevented from being damaged during operation, and the dynamic energy consumption management and control of the power-consuming device in the family is realized.

When the external power supply currently connected to the power-consuming device is the backup power supply, the present application can form a local area network by grouping the power-consuming devices that have been networked in the user's home, and uses one of the power-consuming devices as a temporary master device to perform dynamic energy consumption management and control. It should be noted that, since the second processing device is in connection with the power-consuming device and continuously performs data interaction, the two may be regarded as a whole, that is, the temporary master device may be the second processing device or the power-consuming device, and the present application mainly takes the temporary master device being the power-consuming device as an example for description.

In some implementations, if the value of the first timer is greater than the first preset value Tmax, it is considered that the power-consuming device needs to enter the dynamic energy consumption management mode for operation, and at this point, the second processing device begins to execute the automatic mesh network formation.

When performing the automatic mesh network formation, the temporary master device is selected first. The identification manner is that: when the value of the first timer of the second processing device satisfies Ti≥(Tmax+Tmax*Ni), the second processing device becomes the temporary master device, that is, the second processing device having the smallest intra-network encoding is the temporary master device. Ni is the intra-network encoding of the second processing device. The remaining second processing devices are slave devices.

After the temporary master device is determined, the temporary master device may be configured to send a broadcast message and a designated message to the slave devices, so as to realize the automatic mesh network formation. The designated message may also be referred to as a polling message.

The broadcast message includes one or more of the following: a network identification code, a first communication mode code, a reference limit current, and an intra-network encoding of the temporary master device. The reference limit current is used by the slave device to determine the currently-allowed operating current. The first communication mode code is used to indicate that the type of a current message is the broadcast message. In some implementations, the broadcast message at least includes the reference limit current.

The designated message includes one or more of the following: a network identification code, a second communication mode code, an intra-network encoding of a designated slave device, and request information. The second communication code is used to indicate that the type of the current message is the designated message, and the request information is used to request power demand information. In some implementations, the designated message at least includes the intra-network encoding of the designated slave device and the request information.

The request information is used to request the power demand information, and the request information may be a control instruction.

The slave device is configured to: set the value of the first timer to 0 if the broadcast message is received; and send the power demand information to the temporary master device if the designated message is received and the intra-network encoding of the designated slave device in the designated message is the intra-network encoding of the slave device itself. The designated message may be ignored by the slave device if the intra-network encoding of the designated slave device in the designated message is not the intra-network encoding of the slave device itself.

In some implementations, the slave device is configured to: if the broadcast message is received, calculate the currently-allowed operating current according to the reference limit current, and send the currently-allowed operating current to the power-consuming device for energy consumption control.

In some implementations, the temporary master device may send the designated message to the plurality of slave devices by polling, and each time the designated message carries the intra-network encoding of a different slave device. In this way, the temporary master device may obtain the power demand information of all the slave devices (or power-consuming devices) by polling. In some implementations, the temporary master device may send the designated message in descending order or ascending order of the intra-network encodings, and cyclically transmit the designated message.

The power demand information may be a power consumption coefficient. The slave device is configured to determine a power consumption coefficient based on one or more of the following: a difference between a set temperature and an ambient temperature in a current operating mode, a reference temperature difference, a rated current of the current operating mode, and a reference rated current, and send the power consumption coefficient to the temporary master device.

The power consumption coefficient may be calculated according to the following formula:

$$Ki=(\Delta T/\Delta T\max)\times(Rc/RC\max)$$

where Ki is the power consumption coefficient of the i-th power-consuming device, ΔT is the difference between the set temperature and the ambient temperature, ΔTmax is the reference temperature difference, Rc is the rated current of the current operating mode, and RCmax is the reference rated current.

Taking an air conditioner as an example, for a cooling mode, ΔT=indoor ambient temperature-set temperature; and for a heating mode, ΔT=set temperature-indoor ambient temperature. When ΔT is smaller than 0, ΔT is set to 0 by default, indicating that the indoor ambient temperature has reached the set temperature. Rc is the rated current of the air conditioner, which is calibrated when the air conditioner leaves the factory. ΔTmax and RCmax may be sent from the first processing device to the second processing device during network configuration.

In some implementations, the temporary master device is configured to determine a reference limit current according to a total power consumption coefficient of the plurality of power-consuming devices and a maximum allowed total current. For example, the reference limit current may be determined according to the following formula:

$$Ir=I\max/Kt$$

$$Kt=\sum_{i=1}^{n}Ki$$

where Ir is the reference limit current, Imax is the maximum allowed total current, Ki is the power consumption coefficient of the i-th power-consuming device, Kt is the total power consumption coefficient, and n is the number of power-consuming devices, nis a positive integer.

The slave device is configured to determine a currently-allowed operating current based on a product of the reference limit current and the power consumption coefficient of the slave device itself, and send the currently-allowed operating current to a power-consuming device connected to the slave device to adjust an operating mode of the power-consuming device.

That is, after receiving the reference limit current, the slave device may multiply the reference limit current by the power consumption coefficient of the slave device itself to obtain the currently-allowed operating current, and the power-consuming device may adjust the operating mode according to the operating current.

For example, the currently-allowed operating current may be determined according to the following formula:

$$Ii=Ir\times Ki$$

where Ii is the currently-allowed operating current of the i-th power-consuming device, Ir is the reference limit current, and Ki is the power consumption coefficient of the i-th power-consuming device.

In some implementations, the temporary master device is configured to set the reference limit current to 0 before obtaining the power consumption coefficients of the plurality of power-consuming devices. In this way, the power-consuming devices may be stopped from operating before the appropriate reference limit current is determined, thus, a situation where the operating current of the power-consuming devices is too large, causing the power-consuming device to malfunction is avoided.

In some implementations, the broadcast message and the designated message are sent in an alternating manner, i.e., the sending manner is: sending the broadcast message once+sending the designated message once. In this way, it is possible to prevent the value of the first timer for machine maintenance from exceeding (Tmax+Tmax*Ni), avoiding the scenario where multiple temporary master devices are involved.

In some implementations, the slave device may recalculate the power consumption coefficient each time the slave device receives the designated message for itself, to dynamically update the power consumption coefficient. For instance, when the indoor ambient temperature or the set temperature of the air conditioner changes, the power consumption coefficient will also change accordingly. By dynamically updating the power consumption coefficient, the temporary master device can dynamically adjust the current allocated to the slave device, enabling the power-consuming device to operate in a reasonable state.

It should be noted that if the power-consuming device is in a power-off state, the power consumption coefficient corresponding to the power-consuming device is 0.

In some implementations, if the temporary master device and the slave devices receive information from the first processing device 13 indicating that the first processing device 13 has activated to operate normally and the external power supply has been restored to the first power supply (e.g., the mains power supply), in this case, the temporary master device and the slave devices all revert to be slave devices, the value of the first timer is set to 0, and the power-consuming devices within the network resume full operation.

The following describes the processing procedure when the external power supply is the backup power supply, taking the air conditioner as an example of the power-consuming device.

Assuming that an air conditioner A, an air conditioner B, and an air conditioner C are connected to the second processing devices numbered Ni (i=1, 2, 3) respectively, and are all connected to the power supply (considered to be able to operate normally), and Tmax is set to 10 s. When the first processing device 13 operates normally, the values of the first timers Ti (i=1, 2, 3) of the three second processing devices 14 within the network are all 0, and when the first processing device 13 is not in operation, the first timers Ti (i=1, 2, 3) of the three second processing devices 14 start timing. According to the rule of "Ti≥(Tmax+Tmax*Ni)", the air conditioner A first meets this condition and is designated as the temporary master device. The air conditioner starts to send data in a broadcast+polling manner, i.e., broadcasting once, communicating once with air conditioner B, broadcasting once, communicating once with air conditioner C, broadcasting once, communicating once with air conditioner B, and so on. When the air conditioner B and the air conditioner C, upon receiving the broadcast information of the air conditioner A, set their respective timers Ti (i=2, 3) to 0.

Assuming that the air conditioner A is powered off (for example, the air conditioner A and the second receiving device connected to the air conditioner A are both powered off), at this time, the air conditioner B and the air conditioner C as slave devices cannot receive information sent by the air conditioner A, and the first timers of the air conditioner B and the air conditioner C start timing. According to the rule of "Ti≥(Tmax+Tmax*Ni)", the air conditioner B will first meet the condition to become a temporary master device, and starts to send data in a broadcast+polling manner, i.e., that is, broadcasting once, communicating with the air conditioner C once, broadcasting once, communicating with the air conditioner A once, broadcasting once, communicating with the air conditioner C once, and so on. Since the air conditioner A is powered off, the temporary master device cannot receive a response from the air conditioner A, but the temporary master device still polls one by one.

If the air conditioner A is reconnected to the power supply, the air conditioner A, after starting to operate, will receive the information sent by the current temporary master device, and the timer Ti (i=1) of the air conditioner A will not accumulate counts, so that the air conditioner A will operate as a slave device in subsequent operations instead of reverting to the temporary master device.

In an embodiment of the present application, the first power supply 111 is the mains power supply, the second power supply 112 is the backup power supply provided by a power generation device. The switch circuit 12 is configured to: connect the first power supply 111 to the power-consuming device 15 when the first power supply 111 is not faulty; and connect the second power supply 112 to the power-consuming device 15 when the first power supply 111 is faulty.

When connecting one of the first power supply 111 and the second power supply 112 to the power-consuming device 15 according to the preset rule, the following principle is followed: connecting the first power supply 111 (i.e., a strong power grid, such as the mains power supply) to the power-consuming device 15 when the first power supply 111 is not faulty; and connecting the second power supply 112 (i.e., a weak power grid, such as a power supply provided by a power generation device) to the power-consuming device 15 when the first power supply 111 is faulty. In this embodiment, a connection priority between the first power supply 111 and the second power supply 112 is determined, that is, the first power supply 111 is connected to the power-consuming device 15 first, and when the first power supply 111 is faulty, the second power supply 112 is connected to the power-consuming device 15. In a specific embodiment, the first power supply 111 and the second power supply 112 may be controlled in an interlocking manner, so that the two power supplies are prevented from being mixed. Meanwhile, the first power supply 111 is the mains power supply, which can provide a stable and high-quality voltage for the power-consuming device 15, and is conducive to the full functionality and extended lifespan of the power-consuming device 15. The second power supply 112 is the backup power supply provided by the power generation device, ensuring continuous power to the power-consuming device 15 when the mains power supply is faulty, and maintaining uninterrupted normal operation of the power-consuming device 15.

In an embodiment of the present application, the switch circuit 12 includes a first switch 121 and a second switch 122. The first power supply 111 is connected to the power-consuming device 15 via the first switch 121, and the second power supply 112 is connected to the power-consuming device 15 via the second switch 122. The first power supply 111 is connected to the power-consuming device 15 when the first switch 121 is switched on and the second switch 122 is switched off. The second power supply 112 is connected to the power-consuming device 15 when the first switch 121 is switched off and the second switch 122 is switched on.

Figure 5:
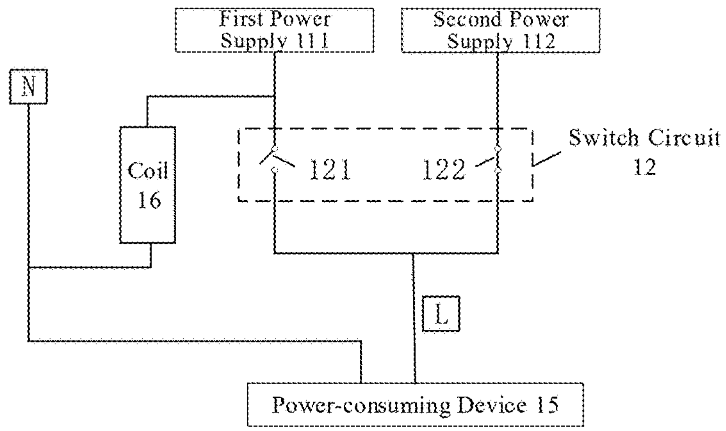
FIG. 5 is a structural schematic diagram of a switch circuit according to an embodiment of the present application.

FIG. 5 is a structural schematic diagram of a switch circuit according to an embodiment of the present application. As shown in FIG. 5, in this embodiment, the power-consuming device 15 is connected to one of the first power supply 111 and the second power supply 112 through the switch circuit 12. The switch circuit 12 includes: a first switch 121 and a second switch 122. The first power supply 111 is connected to the power-consuming device 15 via the first switch 121. The second power supply 112 is connected to the power-consuming device 15 via the second switch 122. As can be seen from FIG. 5, when the first power supply 111 is not faulty, the first switch 121 is switched on and the second switch 122 is switched off, so that the first power supply 111 is connected to the power-consuming device 15, and the first power supply 111 may supply power to the power-consuming device 15 through the coil 16. When the first power supply 111 is faulty, the first switch 121 is switched off and the second switch 122 is switched on, so that the second power supply 112 is connected to the power-consuming device 15. Thereby, the power supply connected to the power-consuming device 15 can be automatically selected and switched through the switch circuit.

Figure 6:
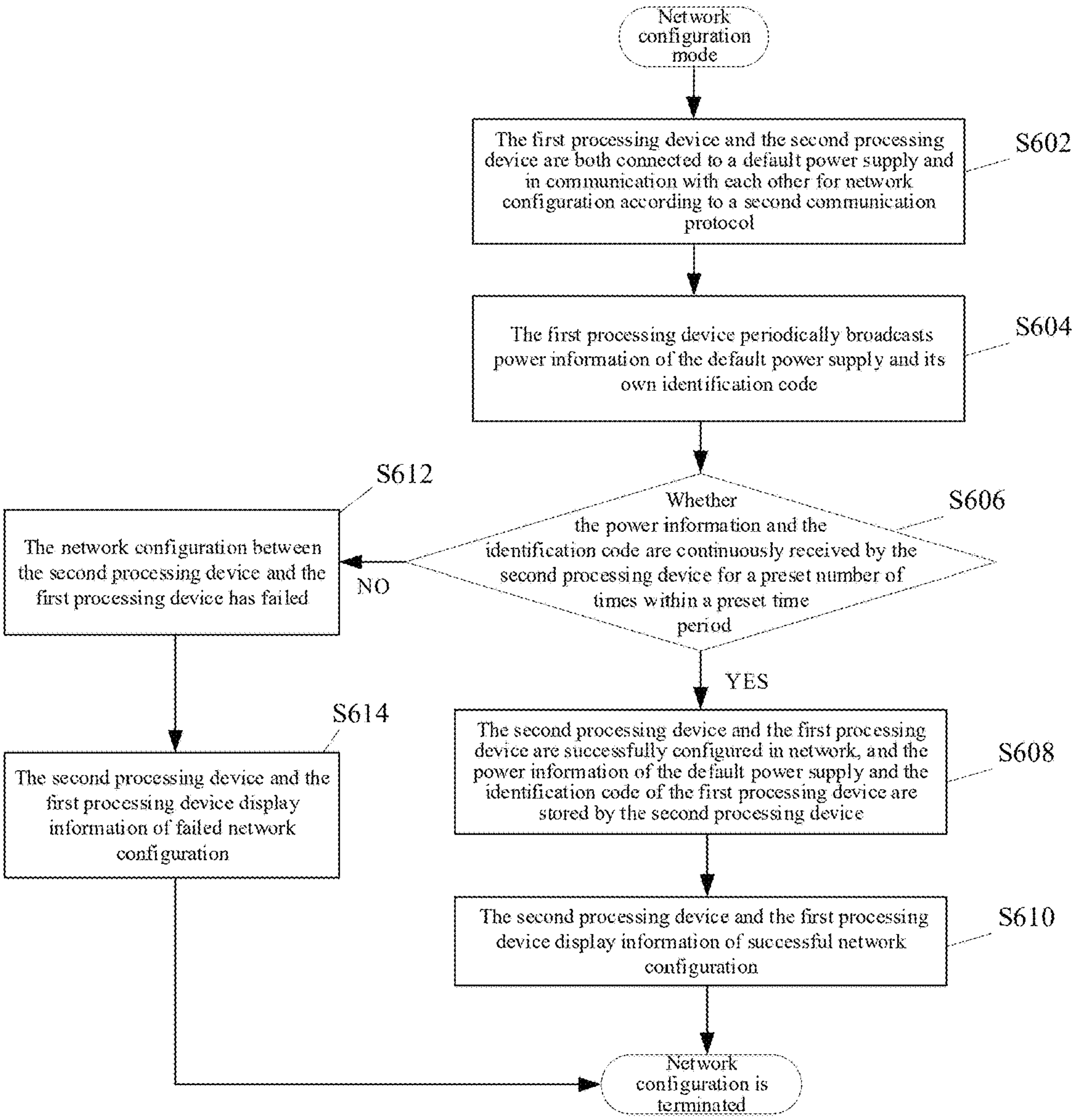
FIG. 6 is a flow chart of a distribution network mode according to a specific embodiment of the present application.

FIG. 6 is a flow chart of a network configuration mode according to a specific embodiment of the present application.

As shown in FIG. 6, in step S602, in the network configuration mode, the first processing device 13 and the second processing device 14 are both connected to a default power supply and are in communication with each other for network configuration according to a second communication protocol. The second communication protocol is different from the first communication protocol.

In step S604, the first processing device 13 periodically broadcasts the power information of the default power supply and its own identification code.

In step S606, within a preset time period, the second processing device 14 determines whether the power information and the identification code are continuously received for a preset number of times.

In step S608, if the second processing device 14 continuously receives the power information and the identification code for the preset number of times within the preset time period, it is determined that the second processing device 14 and the first processing device 13 are successfully configured in network, and the power information of the default power supply and the identification code of the first processing device 13 are stored by the second processing device 14.

In step S610, the second processing device 14 and the first processing device 13 display information of successful network configuration.

In step S612, if the second processing device 14 does not continuously receive the power information and the identification code for the preset number of times within the preset time period, it is determined that the network configuration between the second processing device 14 and the first processing device 13 has failed, and the process of communication for network configuration is terminated.

The second processing device 14 does not continuously receive the power information and the identification code for the preset number of times within the preset time period, including that the second processing device 14 fails to receive the power information of the default power supply and the identification code of the first processing device 13, or the number of times that the second processing device 14 continuously receives the power information of the default power supply and the identification code of the first processing device 13 within the preset time period is smaller than the preset number of times.

In step S614, the second processing device 14 and the first processing device 13 display information of failed network configuration.

It can be seen that the method for the first processing device 13 and the second processing device 14 to communicate for network configuration according to the second communication protocol is not only simple and straightforward in judgment, but also does not rely on hardware, resulting in lower costs. Meanwhile, it can be determined that the second processing device 14 and the first processing device 13 are successfully configured in network only when the number of times that the second processing device 14 continuously receives the power information of the default power supply and the identification code of the first processing device 13 reaches the preset number of times. By increasing the standard of network configuration, it is possible to prevent the second processing device 14 from mistakenly receiving and storing other information, thus, the security and accuracy of communication for network configuration can be effectively enhanced.

Figure 7:
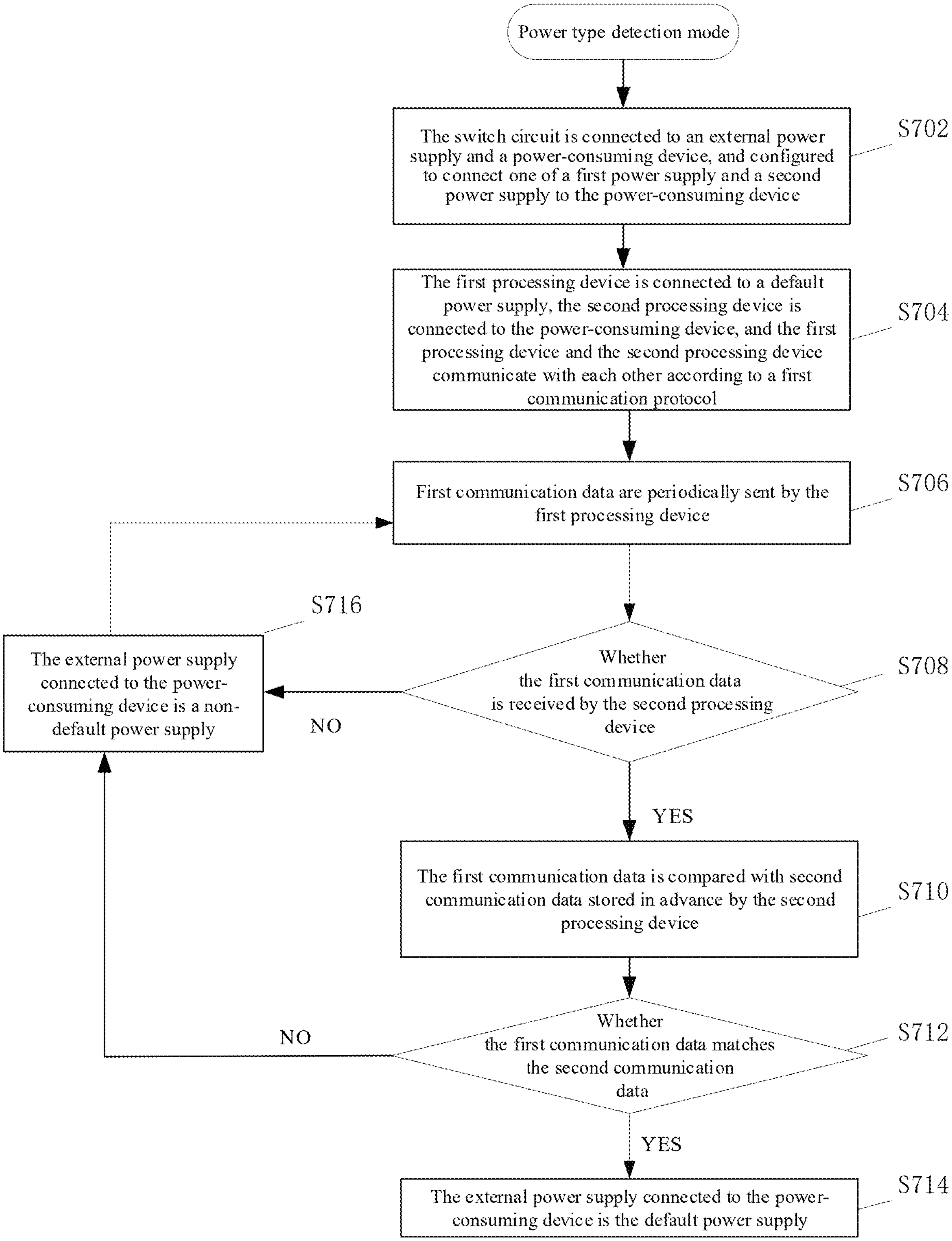
FIG. 7 is a flow chart of a power type detection mode according to a specific embodiment of the present application.

FIG. 7 is a flow chart of a power type detection mode according to a specific embodiment of the present application.

As shown in FIG. 7, in step S702, the switch circuit 12 is connected to the external power supply and the power-consuming device 15, and configured to connect one of the first power supply 111 and the second power supply 112 to the power-consuming device 15. The power-consuming device 15 is powered by being connected to one of the first power supply 111 and the second power supply 112 through the switch circuit 12.

In step S704, the first processing device 13 is connected to a default power supply which is either the first power supply 111 or the second power supply 112, and the second processing device 14 is connected to the power-consuming device 15 when the power-consuming device 15 is powered on and enters the power type detection mode. The first processing device 13 and the second processing device 14 communicate with each other according to the first communication protocol.

In step S706, first communication data is periodically sent by the first processing device 13.

In step S708, it is determined by the second processing device 14 whether the first communication data is received.

In step S710, if the first communication data is received by the second processing device 14, the first communication data is compared with second communication data stored in advance by the second processing device 14.

In step S712, it is determined whether the first communication data matches the second communication data.

In step S714, the external power supply connected to the power-consuming device is determined as the default power supply if the first communication data matches the second communication data.

In step S716, if the first communication data is not received by the second processing device 14, or the first communication data received by the second processing device 14 does not match the second communication data, the external power supply connected to the power-consuming device is determined as a non-default power supply.

Based on this, the present application can automatically identify the type of the external power supply 11 connected to the power-consuming device 15. Thus, when the external power supply 11 changes, the power-consuming device 15 can timely identify the change information of the type of the external power supply 11, which thus facilitates the power-consuming device 15 to timely adjust the control strategy to adapt to different types of external power supplies 11, avoiding damage to the power-consuming device 15, and helping to improve the operational safety and service life of the power-consuming device 15.

Figure 8:
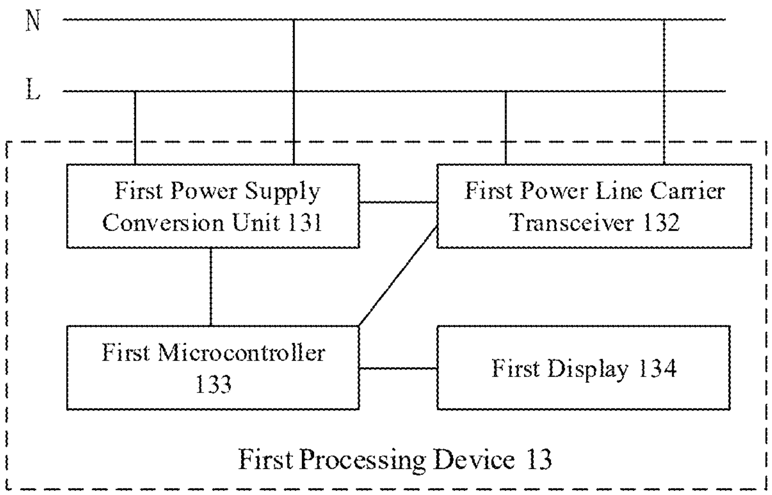
FIG. 8 is a structural schematic diagram of a first processing device according to a specific embodiment of the present application.

FIG. 8 is a schematic diagram of a structure of the first processing device according to a specific embodiment of the present application. As shown in FIG. 8, in this specific embodiment, the first processing device 13 includes a first power supply conversion unit 131, a first microcontroller 133, a first power line carrier transceiver 132, and a first display 134. Here, the first power supply conversion unit 131 is configured to convert an alternating current into a direct current, and provide a stable power supply for the first microcontroller 133 and the first power line carrier transceiver 132. The first power line carrier transceiver 132 is configured to modulate and demodulate communication data, and superimpose the modulated data into an external power supply when transmitting data, and transmit the demodulated carrier information in the external power supply to the first microcontroller 133 when receiving data. The first microcontroller 133 is configured to process the communication data between the first processing device 13 and the second processing device 14. The first display 134 is configured to display information, and the displayed information includes, but is not limited to, information of successful network configuration or failed network configuration.

Figure 9:
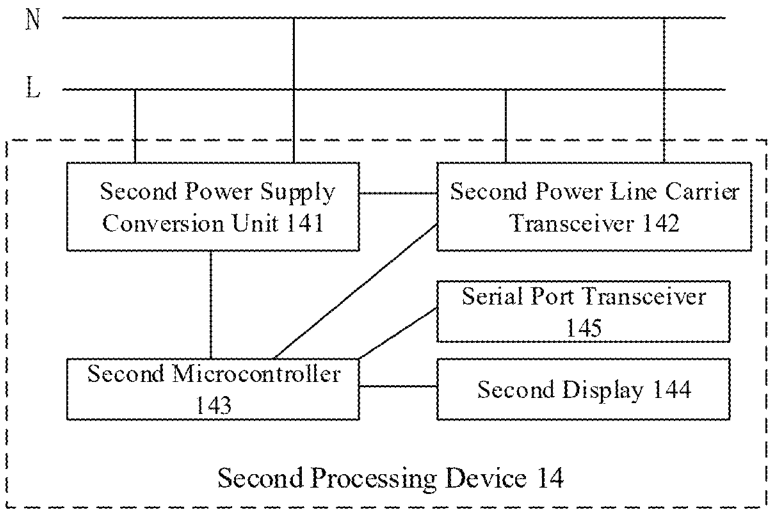
FIG. 9 is a structural schematic diagram of a second processing device according to a specific embodiment of the present application.

FIG. 9 is a schematic diagram of a structure of the second processing device according to a specific embodiment of the present application. As shown in FIG. 9, in this specific embodiment, the second processing device 14 includes a serial port transceiver 145, a second power supply conversion unit 141, a second microcontroller 143, a second power line carrier transceiver 142, and a second display 144. The second processing device 14 is connectable to an external power supply and the power-consuming device 15. Here, the second power supply conversion unit 141 is configured to convert an alternating current into a direct current, and provide a stable power supply for the second microcontroller 143 and the second power line carrier transceiver 142. The second power line carrier transceiver 142 is configured to modulate and demodulate communication data, and superimpose the modulated data into an external power supply when transmitting data, and transmit the demodulated carrier information in the external power supply to the second microcontroller 143 when receiving data. The serial port transceiver 145 is configured to transmit data between the second microcontroller 143 and the power-consuming device 15. The second microcontroller 143 is configured to process communication data between the first processing device 13 and the power-consuming device 15. The second display 144 is configured to display information, and the displayed information includes, but is not limited to, information of successful network configuration or failed network configuration.

Figure 10:
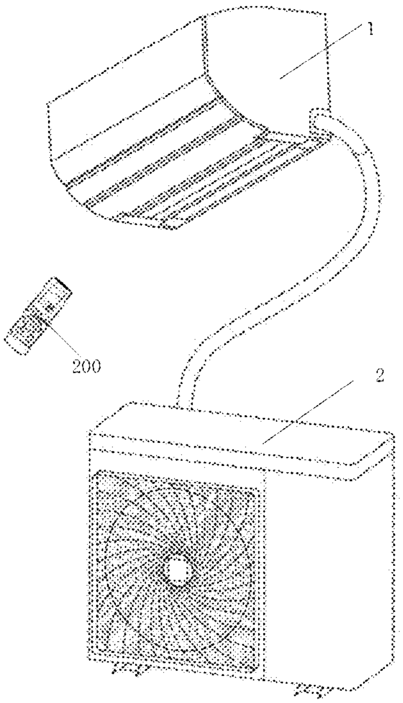
FIG. 10 is a structural schematic diagram of an air conditioner according to a specific embodiment of the present application.
Figure 11:
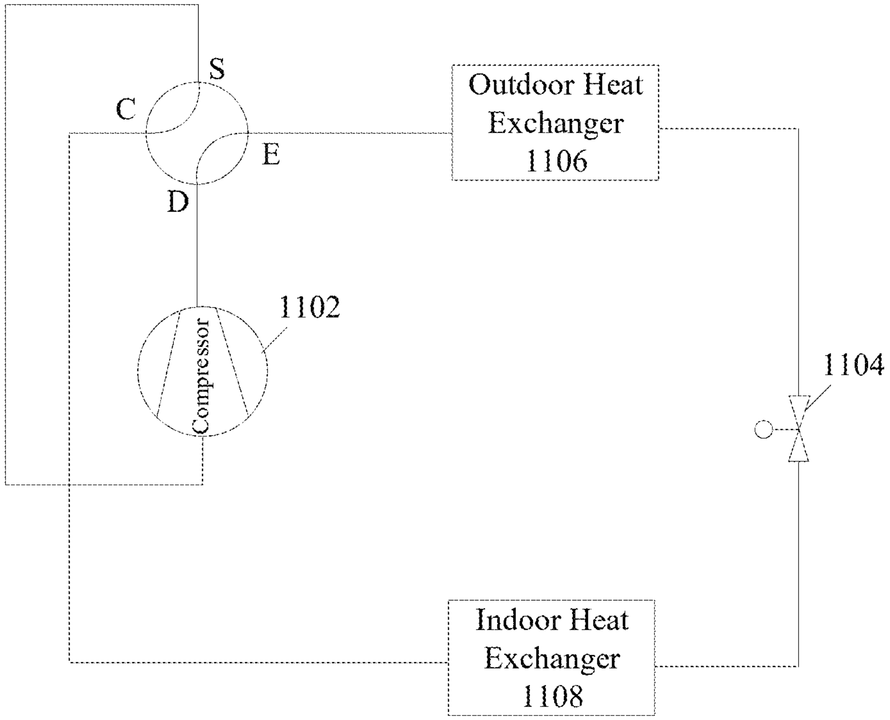
FIG. 11 is a structural schematic diagram of a refrigeration system of the air conditioner according to an embodiment of the present application.

FIG. 10 is a schematic diagram of a structure of an air conditioner according to an embodiment of the present application, and FIG. 11 is a schematic diagram of a structure of a refrigeration system of the air conditioner according to an embodiment of the present application. Since air conditioners are widely used in production and daily life, and in certain specific locations, it is necessary to keep the air conditioners continuously operational. The air conditioner according to some embodiments of the present application is powered by being connected to one of the first power supply 111 and the second power supply 112 through the switch circuit 12, and when the air conditioner is powered on and enters the power type detection mode, the first processing device 13 is connected to a default power supply which is either the first power supply 111 or the second power supply 112. The second processing device 14 is connected to the air conditioner, and the first processing device 13 and the second processing device 14 communicate with each other according to a first communication protocol. The second processing device 14 may determine the type of the external power supply 11 currently connected to the air conditioner according to a communication result. Based on this, the present application can automatically identify the type of the external power supply 11 connected to the air conditioner, Hereby, when the external power supply 11 changes, the air conditioner can identify the change information of the type of the external power supply 11 in time, which thus facilitates the air conditioner to promptly adjust the control strategy to adapt to different types of external power supplies 11, avoiding damage to the air conditioner, and helping to improve the operational safety and service life of the air conditioner.

In a specific embodiment, as shown in FIG. 10, the air conditioner includes a refrigeration system for heat exchange with indoor air to achieve refrigeration or heating requirements.

As shown in FIG. 11, the refrigeration system includes a compressor 1102, a condenser, an electronic expansion valve 1104 and an evaporator. The air conditioner according to some embodiments of the present application performs a refrigeration cycle of the air conditioner by using the compressor 1102, the condenser, the electronic expansion valve 1104 and the evaporator. The refrigeration cycle includes a series of processes involving compression, condensation, expansion and evaporation, supplying refrigerant to the air that has been conditioned and undergone heat exchange.

The compressor compresses the refrigerant gas in a high-temperature and high-pressure state and discharges the compressed refrigerant gas. The discharged refrigerant gas flows into the condenser. The condenser condenses the compressed refrigerant into a liquid phase, and heat is released to the surrounding environment through the condensation process.

The electronic expansion valve causes the high-temperature, high-pressure liquid-phase refrigerant condensed in the condenser to expand into a low-pressure liquid-phase refrigerant. The evaporator evaporates the refrigerant expanded in the electronic expansion valve and returns the low-temperature, low-pressure refrigerant gas back to the compressor.

The evaporator can achieve the refrigeration effect by utilizing the latent heat of vaporization of the refrigerant to exchange heat with the material to be cooled. The air conditioner can regulate the temperature of the indoor space throughout the entire cycle.

The outdoor unit 2 of the air conditioner refers to the part of the refrigeration cycle that includes the compressor 1102 and the outdoor heat exchanger 1106, while the indoor unit 1 of the air conditioner includes the indoor heat exchanger 1108. The electronic expansion valve may be provided in the indoor unit 1 or the outdoor unit 2.

The indoor heat exchanger 1108 and the outdoor heat exchanger 1106 serve as a condenser or an evaporator. When the indoor heat exchanger serves as a condenser, the air conditioner serves as a heater in a heating mode, and when the indoor heat exchanger serves as an evaporator, the air conditioner serves as a cooler in a cooling mode.

The air conditioner in some embodiments of the present application includes an indoor unit 1 and an outdoor unit 2. The indoor unit 1 and outdoor unit 2 may be configured as either a packaged unit or a split system. The indoor unit 1 may be configured as a wall-mounted unit, ceiling cassette, or ducted unit, etc., and the indoor unit 1 is installed on the ceiling or upper section of an indoor room.

Referring to FIG. 10, taking a wall-mounted indoor unit as an example, the wall-mounted indoor unit is usually installed on indoor walls or similar locations. Similarly, the indoor cabinet unit (not shown in the figure) is also a form of the indoor unit 1.

Taking the split system as an example, the air conditioner includes the indoor unit 1 and the outdoor unit 2. The outdoor unit 2, typically installed outdoors, is used for heat exchange with the indoor environment.

In addition, as shown in FIG. 10, the air conditioner is equipped with a controller to regulate the operation of internal components of the air conditioner, enabling each part of the air conditioner to function and achieve the predetermined features of the air conditioning. Herein, a control device 200 is also attached to the air conditioner, and exemplarily, the control device 200 is specifically configured as a remote controller which, for example, has a function of communicating with the controller by using infrared rays or other communication modes. The remote control enables users to perform various controls on the air conditioner, facilitating interaction between the users and the air conditioner.

The indoor unit 1 of the air conditioner in some embodiments of the present application is installed on the top or upper section of the indoor room. Generally, the installation height of the indoor unit 1 is higher than the user activity area. The indoor unit 1 includes a return air inlet and an air outlet which are in communication with the indoor room. The indoor air passes through the indoor unit 1 through the return air inlet and flows back to the indoor room through the air outlet.

The refrigerant circulation loop in some embodiments of the present application enables the refrigerant to circulate within a loop composed of a compressor, a condenser, an electronic expansion valve, and an evaporator. The condenser is an outdoor heat exchanger and the evaporator is an indoor heat exchanger. Or alternatively, the evaporator is the outdoor heat exchanger and the condenser is the indoor heat exchanger. The indoor heat exchanger is used for heat exchange with air inside the indoor unit 1, while the outdoor unit 2 heat exchanger is used for heat exchange with air inside the outdoor unit 2, which thus can meet the cooling or heating requirements of the air conditioner.

The indoor unit 1 also includes an indoor fan assembly. The indoor fan assembly is arranged at the indoor heat exchanger near the return air inlet or the air outlet and is used for sending the air after heat exchange to the indoor. The indoor fan assembly has multiple speed settings, which are used to modulate a discharge air velocity of the air outlet.

An air deflector is arranged at the position of the air outlet. The air deflector is capable of adjusting the air flow direction of the air flowing through the air outlet by changing the relative rotation angle with the air outlet, so as to affect the indoor air temperature stratification.

In an embodiment shown in the present application, the air conditioner 10 also includes a controller which for example is configured as the controller 71 described in any one of the above embodiments.

In conclusion, the power-consuming device 15 according to some embodiments of the present application is power by being connected to one of the first power supply 111 and the second power supply 112 through the switch circuit 12. When the power-consuming device 15 is powered on and enters the power type detection mode, the first processing device 13 is connected to a default power supply which is either the first power supply 111 or the second power supply 112, the second processing device 14 is connected to the power-consuming device 15, and the first processing device 13 and the second processing device 14 communicate with each other according to the first communication protocol. The second processing device 14 can determine the type of the external power supply 11 currently connected to the power-consuming device 15 according to the communication result. Thus, the present application can automatically identify the type of the external power supply 11 connected to the power-consuming device 15. When the external power supply 11 changes, the power-consuming device 15 can identify the change information of the type of the external power supply 11 in time, which facilitates the power-consuming device 15 to promptly adjust the control strategy to adapt to different types of external power supplies 11, avoiding damage to the power-consuming device 15, and helping to improve the operational safety and service life of the power-consuming device 15.

Further embodiments of the present application provide a method for controlling the power-consuming device 15, applicable to the power-consuming device 15 in any one of the above embodiments.

In an embodiment of the present application, a method for controlling a power-consuming device is provided which includes the following steps S1-S2.

In step S1, the first processing device 13 and the second processing device 14 are controlled to enter a power type detection mode when it is determined that the power-consuming device 15 is powered on and activated. In the power type detection mode, the first processing device 13 is connected to a default power supply (i.e., the first power supply), and the first processing device 13 and the second processing device 14 communicate with each other according to the first communication protocol.

In step S2, a type of an external power supply 11 currently connected to the power-consuming device 15 is determined by the second processing device 14 according to a communication result. The external power supply 11 includes the first power supply 111 and the second power supply 112. One of the first power supply 111 and the second power supply 112 is connected to the power-consuming device 15 through the switch circuit 12 to supply power to the power-consuming device 15. The default power supply is one of the first power supply 111 and the second power supply 112.

In an embodiment of the present application, the first processing device 13 and the second processing device 14 communicate with each other according to the first communication protocol, including that the first processing device 13 is activated and periodically sends first communication data. In this embodiment, the first communication data include power information of the default power supply and an identification code of the first processing device 13. In this embodiment, the first processing device 13 includes the identification code for identifying its unique identity, and the power information at least includes a type of power supply. The second processing device 14 is activated and configured determine the type of the external power supply 11 currently connected to the power-consuming device 15 according to whether the first communication data is received by the second processing device itself.

In an embodiment of the present application, the step of determining, by the second processing device 14, the type of the external power supply 11 currently connected to the power-consuming device 15 according to whether the first communication data is received by the second processing device itself includes: determining that the type of the external power supply 11 currently connected to the power-consuming device 15 is the other one of the first power supply 111 and the second power supply 112 when the first communication data is not received.

In an embodiment of the present application, the step of determining, by the second processing device 14, the type of the external power supply 11 currently connected to the power-consuming device 15 according to whether the first communication data is received by the second processing device itself includes: comparing the first communication data with second communication data stored in advance by the second processing device 14 when the first communication data is received, and determining the type of the external power supply 11 currently connected to the power-consuming device 15 according to a comparison result. In this embodiment, the second communication data include an identification code of a target processing device with which the first processing device 13 is successfully configured in network and power information of a power supply that is connected to the target processing device.

In an embodiment of the present application, the step of determining, by the second processing device 14, the type of the external power supply 11 currently connected to the power-consuming device 15 according to the comparison result, includes: determining that the type of the external power supply 11 currently connected to the power-consuming device 15 is the default power supply when the first communication data matches the second communication data; and determining that the type of the external power supply 11 currently connected to the power-consuming device 15 is the other one of the first power supply 111 and the second power supply 112 when the first communication data does not match the second communication data.

In an embodiment of the present application, before the first processing device 13 and the second processing device 14 are controlled to enter the power type detection mode, the method also includes a step of controlling the first processing device 13 and the second processing device 14 to enter a network configuration mode. In the network configuration mode, the first processing device 13 and the second processing device 14 are simultaneously connected to the default power supply, and the first processing device 13 and the second processing device 14 communicate for network configuration according to a second communication protocol. The second communication protocol is different from the first communication protocol.

In an embodiment of the present application, the first processing device 13 and the second processing device 14 communicating for network configuration according to the second communication protocol includes that the first processing device 13 periodically broadcasts power information of the default power supply and its own identification code. If the number of times that the second processing device 14 continuously receives the power information of the default power supply and the identification code of the first processing device 13 within a preset time period reaches a preset number, it is determined that the second processing device 14 and the first processing device 13 are successfully configured in network, and the power information of the default power supply and the identification code of the first processing device 13 are stored, otherwise, it is determined that the network configuration fails, and the process of communication for network configuration is terminated.

In an embodiment of the present application, the method also includes steps of: displaying, by the second processing device 14, prompt information of successful network configuration or prompt information of failed network configuration, and correspondingly sending feedback information of successful network configuration or feedback information of failed network configuration to the first processing device 13; and correspondingly displaying, by the first processing device 13 when receiving the feedback information of successful network configuration or the feedback information of failed network configuration, the prompt information of successful network configuration or the prompt information of failed network configuration.

In an embodiment of the present application, the first power supply 111 is a mains power supply, the second power supply 112 is a backup power supply provided by a power generation device, and one of the first power supply 111 and the second power supply 112 is connected to the power-consuming device 15 according to a preset rule, including that: the first power supply 111 is firstly connected to the power-consuming device 15 through the switch circuit 12 when the first power supply 111 is not faulty; and the second power supply 112 is connected to the power-consuming device 15 through the switch circuit 12 when the first power supply 111 is faulty.

In an embodiment of the present application, the switch circuit 12 includes a first switch 121 and a second switch 122; the first power supply 111 is connected to the power-consuming device 15 via the first switch 121, and the second power supply 112 is connected to the power-consuming device 15 via the second switch 122. The first power supply 111 is connected to the power-consuming device 15 when the first switch 121 is switched on and the second switch 122 is switched off. The second power supply 112 is connected to the power-consuming device 15 when the first switch 121 is switched off and the second switch 122 is switched on.

In the method for controlling the power-consuming device 15 according to some embodiments of the present application, the power-consuming device 15 is powered by being connected to one of the first power supply 111 and the second power supply 112 through the switch circuit 12. When the power-consuming device 15 is powered on and enters the power type detection mode, the first processing device 13 is connected to a default power supply, which is either the first power supply 111 or the second power supply 112. The second processing device 14 is connected to the power-consuming device 15. The first processing device 13 and the second processing device 14 communicate with each other according to the first communication protocol. The second processing device 14 can determine the type of the external power supply 11 connected to the power-consuming device 15 according to the communication result. Based on this, the present application can automatically identify the type of the external power supply 11 connected to the power-consuming device 15. Thus, the power-consuming device 15 can promptly detect the change in the type of the external power supply 11 when the external power supply 11 changes, facilitating timely adjustment of control strategies to adapt to different types of external power supplies 11. This helps prevent damage to the power-consuming device 15 and enhances the operational safety and service life of the power-consuming device 15.

What is claimed is:

1. A power supply system for a power-consuming device, comprising:

a switch circuit, one end of the switch circuit being connected to an external power supply, the external power supply comprising a first power supply and a second power supply, the first power supply and the second power supply being of different types, another end of the switch circuit being connected to the power-consuming device, the switch circuit being configured to connect one of the first power supply and the second power supply to the power-consuming device according to a preset rule to supply power to the power-consuming device;

a first processing device and a second processing device, the first processing device and the second processing device being capable of communicating with each other; and a controller, the controller being connected to the first processing device and the second processing device respectively, the controller being configured to:

control, upon a power-on activation of the power-consuming device, the first processing device and the second processing device to enter a power type detection mode, wherein in the power type detection mode, the first processing device is connected to the first power supply, the second processing device is connected to the power-consuming device, and the first processing device and the second processing device communicate with each other according to a first communication protocol; and wherein the second processing device is configured to determine a type of the external power supply currently connected to the power-consuming device according to a communication result between the second processing device and the first processing device.

2. The power supply system according to claim 1, the first processing device is configured to periodically send first communication data in the power type detection mode, wherein the first communication data comprise power information of the first power supply and a network identification code, the network identification code is an identification code of the first processing device, the power information at least comprises a type of power supply; and the second processing device is configured to determine, in the power type detection mode, the type of the external power supply currently connected to the power-consuming device according to whether the first communication data is received.

3. The power supply system according to claim 2, the second processing device is configured to:

determine that the type of the external power supply currently connected to the power-consuming device is the second power supply when a value of a first timer is greater than a first preset value and the first communication data is not received.

4. The power supply system according to claim 2, the second processing device is configured to:

compare the first communication data with second communication data stored in advance by the second processing device itself when a value of a first timer is smaller than or equal to a first preset value and the first communication data is received, and determine the type of the external power supply currently connected to the power-consuming device according to a comparison result, wherein the second communication data comprise a network identification code of a target processing device with which the first processing device is successfully configured in network and power information of a power supply connected to the target processing device.

5. The power supply system according to claim 4, wherein the second processing device is configured to:

determine that the type of the external power supply currently connected to the power-consuming device is the first power supply when the first communication data matches the second communication data; and determine that the type of the external power supply currently connected to the power-consuming device is the second power supply when the first communication data does not match the second communication data.

6. The power supply system according to claim 5, wherein the second processing device is further configured to set the value of the first timer to zero when the first communication data matches the second communication data.

7. The power supply system according to claim 1, wherein the controller, before controlling the first processing device and the second processing device to enter the power type detection mode, is further configured to:

control the first processing device and the second processing device to enter a network configuration mode, in the network configuration mode, the first processing device and the second processing device are both connected to the first power supply, and the first processing device and the second processing device communicate for network configuration according to a second communication protocol, wherein the second communication protocol is different from the first communication protocol.

8. The power supply system according to claim 7, wherein the first processing device is configured to, in the network configuration mode, periodically broadcast third communication data, the third communication data comprise power information of the first power supply and a network identification code, the network identification code is an identification code of the first processing device; and the second processing device is configured to, in the network configuration mode, receive the third communication data, and send a first response message to the first processing device if the network identification code in the third communication data is consistent with a network identification code stored by the second processing device itself, wherein the first response message is used to indicate that the second processing device has been configured in network; and send a second response message to the first processing device if the network identification code in the third communication data is inconsistent with the network identification code stored by the second processing device itself, wherein the second response message is used to indicate that the second processing device has not been configured in network.

9. The power supply system according to claim 8, wherein the first power supply is a mains power supply, and the second power supply is a backup power supply;

the first processing device is further configured to, if the second response message is received, send fourth communication data to the second processing device, the fourth communication data comprise one or more of the following: the network identification code, an intra-network encoding of the second processing device, a maximum allowed total current, a reference temperature difference, and a reference rated current;

the second processing device is further configured to receive and store the fourth communication data; and wherein the maximum allowed total current is a maximum current that the backup power supply can support, and at least one of the reference temperature difference and the reference rated current is used by the second processing device to determine power demand information of the power-consuming device.

10. The power supply system according to claim 9, wherein the second processing device comprises a plurality of processing devices, and the power-consuming device comprises a plurality of power-consuming devices, the plurality of processing devices are connected to the plurality of power-consuming devices respectively, when the external power supply currently connected to the power-consuming device is the backup power supply, one of the plurality of processing devices is configured as a temporary master device while remaining processing devices are configured as slave devices, and the temporary master device is configured to allocate currents to the plurality of power-consuming devices according to power demand information of the plurality of power-consuming devices.

11. The power supply system according to claim 10, wherein the temporary master device is configured to send a broadcast message and a designated message to each of the slave devices, the broadcast message comprises the network identification code, a first communication mode code, a reference limit current, and an intra-network encoding of the temporary master device, the designated message comprises the network identification code, a second communication mode code, an intra-network encoding of a designated slave device, and request information, the first communication mode code is used to indicate that a type of a current message is the broadcast message, the second communication mode code is used to indicate that the type of the current message is the designated message, the request information is used to request the power demand information, and the reference limit current is used by each of the slave devices to determine a currently-allowed operating current; and each of the slave devices is configured to: set a value of a first timer to zero if the broadcast message is received; and send power demand information to the temporary master device if the designated message is received and the intra-network encoding of the designated slave device in the designated message is an intra-network encoding of the slave device itself.

12. The power supply system according to claim 11, wherein the power demand information is a power consumption coefficient, and each of the slave devices is configured to determine the power consumption coefficient based on a difference between a set temperature of a current operation mode and an ambient temperature, the reference temperature difference, a rated current of the current operation mode, and the reference rated current and send the power consumption coefficient to the temporary master device.

13. The power supply system according to claim 12, wherein the temporary master device is configured to determine the reference limit current based on a total power consumption coefficient of the plurality of power-consuming devices and the maximum allowed total current.

14. The power supply system according to claim 11, wherein each of the slave devices is configured to determine a currently-allowed operating current based on a product of the reference limit current and the power consumption coefficient of the slave device itself, and send the currently-allowed operating current to the power-consuming device connected to the slave device to adjust an operation mode of the power-consuming device.

15. The power supply system according to claim 11, wherein the broadcast message and the designated message are transmitted in an alternating manner.

16. The power supply system according to claim 10, wherein the temporary master device is a processing device having a smallest intra-network encoding among the plurality of processing devices.

17. The power supply system according to claim 10, wherein the temporary master device, before obtaining the power demand information of the plurality of power-consuming devices, is further configured to set the reference limit current to zero.

18. The power supply system according to claim 1, wherein the first power supply is a mains power supply, the second power supply is a backup power supply provided by a power generation device, and the switch circuit is configured to:

connect the first power supply to the power-consuming device when the first power supply is not faulty; and connect the second power supply to the power-consuming device when the first power supply is faulty.

19. The power supply system according to claim 1, wherein the switch circuit comprises a first switch and a second switch;

the first power supply is connected to the power-consuming device via the first switch, and the second power supply is connected to the power-consuming device via the second switch;

the first power supply is connected to the power-consuming device when the first switch is switched on and the second switch is switched off; and the second power supply is connected to the power-consuming device when the first switch is switched off and the second switch is switched on.

20. The power supply system according to claim 1, wherein the power-consuming device comprises an air conditioner.

* * * * *